March 3, 1964   D. J. REED   3,123,313
APPARATUS FOR FABRICATING A REINFORCED PLASTIC ARTICLE
Original Filed May 8, 1959
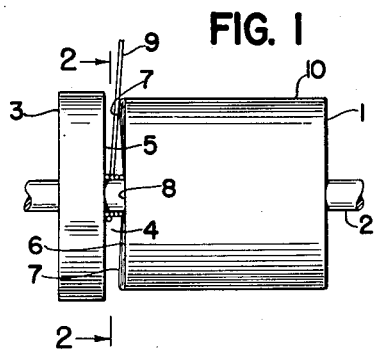
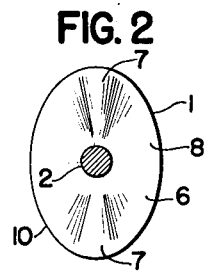
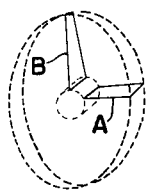
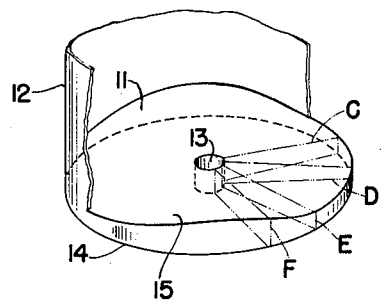
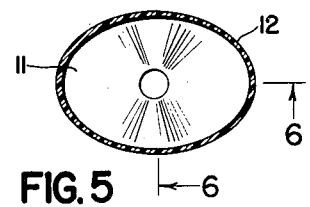
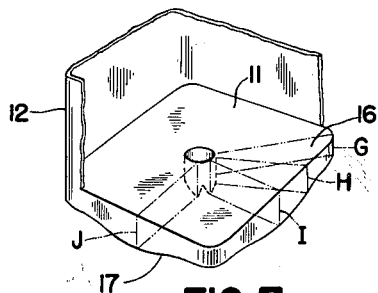
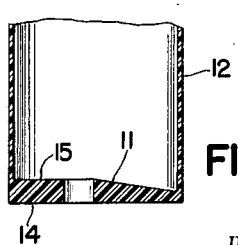
INVENTOR.
DANIEL J. REED
BY
*Andrus & Starke*
Attorneys

United States Patent Office 3,123,313
Patented Mar. 3, 1964

3,123,313
APPARATUS FOR FABRICATING A
REINFORCED PLASTIC ARTICLE
Daniel J. Reed, Milwaukee, Wis., assignor to A. O. Smith Corporation, Milwaukee, Wis., a corporation of New York
Original application May 8, 1959, Ser. No. 811,834, now Patent No. 2,987,217, dated June 6, 1961. Divided and this application Oct. 25, 1960, Ser. No. 64,905
4 Claims. (Cl. 242—7)

This invention relates to the manufacturing of irregularly shaped articles and more particularly to the forming of a reinforced plastic vessel with an integral, irregularly shaped head.

Reinforced plastic vessels have recently found increased use because of their light weight and corrosion resistance to most corrosive media. Generally, a reinforced plastic vessel is formed of a cylindrical shell which may be fabricated by winding substantially continuous reinforcing fibers around the mandrel, or alternately, by laying up glass matting or fabric into a cylindrical or tubular form. In the conventional vessel, a molded head is then secured into the open ends of the cylindrical shell to form the vessel.

It has been proposed to form a reinforced plastic vessel by winding the head integrally with the shell. In a method such as this, the mandrel is provided with a circumferential slot and the fibrous strand is wound in the slot until the winding is flush with the periphery of the mandrel to form the head of the vessel. Additional windings of the fibrous strand are made over the peripheral surface of the vessel to form the wall of the vessel.

A winding method such as this may be satisfactorily used when fabricating a generally cylindrical vessel, but is not suitable when fabricating vessels of rectangular or irregular shape. For example, with a rectangular vessel, the distance from the axis to the midpoint of the side walls is less than the distance from the axis to the corners so that the windings made within the slot to form the head will not be substantially flush over the entire periphery of the slot.

The present invention is directed to a method of fabricating an irregularly shaped vessel with an integral head, and to a mandrel construction for fabricating the vessel.

More specifically, an irregularly shaped mandrel having a contour corresponding to the desired contour in the vessel, is provided with a circumferential slot which extends radially inward to a location adjacent the axis of the mandrel. The slot is formed such that the area of all radial planes in the slot are substantially equal. With a non-circular mandrel, this requires that the width of the slot vary in accordance with the change in the length of the radii of the mandrel.

A reinforcing strip impregnated with a suitable resin or binder is initially wound in the slot and due to the cross sectional area being equal on all radii, the windings will completely fill all portions of the slot. After the windings are flush with the periphery of the mandrel, the winding is continued over the peripheral surface of the mandrel to produce the vessel wall. After the desired number of layers of the fiber strip have been wound over the peripheral surface of the mandrel to provide the vessel wall with the desired strength, the resin is cured to provide a hard integral structure. After curing, the vessel is removed from the mandrel and the central hole in the head is closed off with a suitable plug.

The present invention provides a simple and inexpensive method of producing an irregularly shaped vessel with an integral head. The method produces the vessel in a single winding operation and thereby eliminates the separate forming operation which is usually required for the head and also the operation of assembling a separate head with the shell as is required in the conventional method of fabricating a reinforced plastic vessel.

Other objects and advantages will appear in the course of the following description. The drawings illustrate the best mode presently contemplated of carrying out the invention.

In the drawings:

FIGURE 1 is a side elevation of the mandrel to be used in fabricating the vessel according to the method of the invention;

FIG. 2 is a view taken along line 2—2 of FIG. 1;

FIG. 3 is a diagrammatic representation showing the area of two radial planes within the slot;

FIG. 4 is a perspective view with parts broken away in section sowing a vessel fabricated according to the method of the invention;

FIG. 5 is a transverse section of the vessel of FIG. 4;

FIG. 6 is a vertical section taken along line 6—6 of FIG. 5; and

FIG. 7 is a view similar to FIG. 4 showing a modified form of the vessel in which the vessel is provided with a generally rectangular cross section.

The drawings illustrate a mandrel 1 having a generally oval cross sectional shape which is secured to a central shaft 2. A disc 3 is also secured to the shaft 2 in spaced relation with an end of the mandrel 1 to provide a slot 4 therebetween with the dimension of any radius of said slot being different than the dimension of any other circumferentially displaced radius through at least a portion of the circumferential extent of said slot.

The end surface 5 of the disc 3 which faces the mandrel 1 is substantially flat in contour, while the opposed end wall 6 of the mandrel 1 is contoured to provide raised portions 7 which extend generally along the long axis of the oval mandrel and lowered portions 8 which conform generally to the short axis of the mandrel.

The end wall 6 of the mandrel is formed so that the area of all radial planes extending longitudinally within the slot 4 will be substantially equal. As shown in FIG. 3, the radial plane A, which extends longitudinally of the mandrel and is taken through the slot on the short radius of the mandrel, is of substantially constant thickness, while the radial plane B, which also extends longitudinally of the mandrel and is taken along the long axis of the mandrel 1 within the slot, has a progressively decreasing width. This results in the area of planes A and B being substantially equal even though the length of the radii is different. Thus, all radial planes extending within the slot 4 from the shaft 2 to the peripheral surface of the mandrel 1 have the same area.

A fibrous reinforcing strand 9 impregnated with a suitable binder is wound within the slot 4 until the windings are substantially flush with the peripheral surface 10 of mandrel 1 and then the strand 9 is wound over the outer surface of the mandrel to form the wall of the vessel.

The reinforcing strand is preferably formed of long, substantially continuous fibers and may take the form of mineral fibers, such as glass or asbestos, vegetable fibers, animal fibers, synthetic fibers, such as nylon, rayon, Dacron or the like. The strand 9 has a width substantially smaller than the width of slot 4, so that the strand will readily fill in all portions of the slot, particularly adjacent the contoured end wall 6.

The binding material, which is supplied to the reinforcing strand 9, may take the form of a thermosetting resin, such as an epoxide resin, polyester, urea, formaldehyde and the like. The resin is applied to the fibrous material by any conventional method, such as spraying, dipping, slushing and the like.

The portion of the reinforcing strand 9, which is wound within the slot 4, forms the head 11 of the vessel and the portion of the strand which is wound over the peripheral surface of the mandrel 1, forms the shell 12, as shown in FIG. 4. By constructing the slot 4 such that the area of all radial planes extending within the slot is substantially equal, the entire slot will be filled with the strand without any gaps between turns or convolutions. In addition, the strand wound within the slot will be under uniform tension throughout the entire extent of the slot without any portion of the wound strand being in a slack condition.

After the winding has been completed and the desired number of layers of the reinforcing strand have been wound over the peripheral surface of the mandrel 1 to provide the vessel wall with the desired strength, the entire assembly is heated to a temperature sufficient to cure the resin. After the curing, the disc 3 is removed from the shaft 2 and the vessel is stripped from the mandrel 1. The central hole 13 in the head 11 of the vessel, which is formed by the shaft 2, is enclosed by a suitable plug.

As shown in FIG. 4, the bottom surface 14 of the head 11, which was formed in contact with the flat wall 5 of disc 3, is substantially flat, while the upper surface 15 of the head 11 has a generally undulating contour corresponding to the end wall 6 of mandrel 1. It is to be noted that all radial planes, indicated by C, D, E and F, have substantially the same cross sectional area.

FIG. 7 shows a modified form of the vessel in which the cross section of the vessel is generally rectangular. In this case, the upper surface 16 of the head 11 is generally flat and is formed by using a generally flat end wall 6 on the mandrel. In this case, the bottom surface 17 of the head has an undulating contour produced by forming the end wall 5 of disc 3 with the desired contour. As in the case of the vessel shown in FIG. 4, the radial planes G, H, I and J all have the identical area. In FIG. 7, however, the planes G, H, I and J all have a substantially uniform width throughout their radial extent, while in FIG. 4, the width of the planes varied throughout their length. In each vessel, however, the area of the radial planes is substantially uniform.

While the description has shown heads of oval and generally rectangular shape being formed by the method of the invention, it is contemplated that the vessel and head may have any desired contour except a concavity in the periphery. As the reinforcing material is wound under tension, a reinforcing material would merely bridge or arch over the concavity.

While the above description is directed to a method of making a vessel having an integral head, it is contemplated that the mandrel of the invention can be employed for making any type of an irregularly shaped plate or disc in the same manner as it is used to make the head of a vessel. Similarly, while the disclosure shows the slot 4 being in a plane substantially normal to the axis of mandrel 1, it is contemplated that the slot can be formed angularly or it can have a substantially curved extent.

This application is a divisional application of copending application Serial No. 811,834, filed May 8, 1959, and entitled Reinforced Plastic Article and Structure for Forming the Same, now Patent No. 2,987,217.

Various modes of carrying out the invention are contemplated as being within the scope of the following claims particularly pointing out and distinctly claiming the subject matter which is regarded as the invention.

I claim:

1. In an apparatus for fabricating a reinforced plastic vessel article from a substantially continuous strand, a mandrel having a generally non-circular cross section and having a circumferential slot therein with the dimension of any radius of said slot being different than the dimension of any other circumferentially displaced radius through at least a portion of the circumferential extent of said slot, and the area of all longitudinally extending radial planes extending within the slot being substantially equal when measured from the bottom of the slot to the periphery of the mandrel and between the opposed walls of the slot.

2. In an apparatus for fabricating a reinforced plastic vessel having an integral head, a mandrel having a peripheral surface disposed to support a strand wound thereon in a generally helical pattern and at least a portion of the radii in any transverse plane in said mandrel being of a different length, said mandrel having a circumferential slot therein with the dimension of any radius of said slot being different than the dimension of any other circumferentially displaced radius through at least a portion of the circumferential extent of said slot, and means on at least one transverse surface bordering the slot for maintaining the area of all longitudinally extending radial planes within the slot substantially equal when measured from the bottom of the slot to the periphery of the mandrel and between the opposed walls of the slot.

3. In an apparatus for fabricating a reinforced plastic vessel having an integral head, a mandrel having a peripheral surface disposed to support a strand wound thereon in a generally circumferential pattern and with the length of any radius of said slot being different than the length of at least a portion of other circumferentially displaced radii of said slot, a shaft connected axially to said mandrel, a forming member connected to said shaft and having an end surface spaced axially from an end surface of said mandrel to provide a slot therebetween, and contoured means associated with at least one of said end surfaces for making the area of all longitudinally extending radial planes within the slot substantially equal when measured from the bottom of the slot to the periphery of the mandrel and between the opposed walls of the slot.

4. In an apparatus for fabricating a reinforced plastic vessel having an integral head, a mandrel having a peripheral surface disposed to support a strand wound thereon in a generally helical pattern, a shaft connected axially to said mandrel, a forming member connected to said shaft and having an end surface spaced axially from an end surface of said mandrel to provide a slot therebetween with the dimension of any radius of said slot being different than the dimension of any other circumferentially displaced radius through at least a portion of the circumferential extent of said slot, and contoured means associated with at least one of said end surfaces for making the area of all longitudinally extending radial planes within the slot substantially equal when measured from the bottom of the slot to the periphery of the mandrel and between the opposed walls of the slot.

References Cited in the file of this patent

UNITED STATES PATENTS

| | | |
|---|---|---|
| 2,277,602 | Novak | Mar. 24, 1942 |
| 2,446,490 | Scherer | Aug. 3, 1948 |
| 2,641,299 | Bloom et al. | June 9, 1953 |